United States Patent
Jia et al.

(10) Patent No.: US 12,083,757 B2
(45) Date of Patent: Sep. 10, 2024

(54) PRODUCTION LINE WITH AUTOMATIC BELT DISASSEMBLING AND ASSEMBLING FOR RUBBER BELT VULCANIZATION

(71) Applicants: TAIZHOU TIANJUN TECHNOLOGY CO., LTD, Zhejiang (CN); WENLING RESEARCH INSTITUTE OF TAIZHOU UNIVERSITY, Zhejiang (CN); TAIZHOU UNIVERSITY, Zhejiang (CN)

(72) Inventors: Wenping Jia, Zhejiang (CN); Libiao Wang, Zhejiang (CN); Shusen Lin, Zhejiang (CN); Shisheng Zheng, Zhejiang (CN)

(73) Assignees: Taizhou Tianjun Technology Co., Ltd, Taizhou (CN); Wenling Research Institute of Taizhou University, Wenling (CN); Taizhou University, Taizhou (CN)

( * ) Notice: Subject to any disclaimer, the term of this patent is extended or adjusted under 35 U.S.C. 154(b) by 0 days.

(21) Appl. No.: 17/920,489

(22) PCT Filed: May 31, 2022

(86) PCT No.: PCT/CN2022/096135
§ 371 (c)(1),
(2) Date: Oct. 21, 2022

(87) PCT Pub. No.: WO2023/201850
PCT Pub. Date: Oct. 26, 2023

(65) Prior Publication Data
US 2024/0208168 A1    Jun. 27, 2024

(30) Foreign Application Priority Data
Apr. 19, 2022 (CN) .......................... 202210410549.2

(51) Int. Cl.
*B29D 29/06* (2006.01)
*B29C 31/00* (2006.01)
(Continued)

(52) U.S. Cl.
CPC ............ *B29D 29/06* (2013.01); *B29C 31/008* (2013.01); *B29K 2021/00* (2013.01); *B29K 2105/24* (2013.01); *B29L 2029/00* (2013.01)

(58) Field of Classification Search
None
See application file for complete search history.

(56) References Cited

FOREIGN PATENT DOCUMENTS

CN    208648067 U  *  3/2019
CN    210453399 U  *  5/2020  ........... B29C 35/002

OTHER PUBLICATIONS

Machine English translation of CN208648067U, Accessed Jun. 12, 2024 (Year: 2019).*

(Continued)

*Primary Examiner* — Jacob T Minskey
*Assistant Examiner* — Adrianna N Knoves
(74) *Attorney, Agent, or Firm* — Kirk A. Wilson; Joseph T. Guy; Patent Filing Specialist Inc.

(57) ABSTRACT

A production line with automatic belt disassembling and assembling for rubber belt vulcanization is provided and includes a working platform, two sides of the working platform are respectively a raw rubber belt placement platform and a finished rubber belt placement platform; and a truss; a rubber belt clamping device, a circular die clamping device and a transferring device are arranged on the truss; the rubber belt clamping device transfers raw rubber belts from raw rubber belt unloading station to disassembling and assembling station, and transfers finished rubber belts from disassembling and assembling station to finished rubber belt loading station; the circular die clamping device controls (Continued)

circular dies to move between the two stations; the transferring device transfers the stacked raw rubber belts and circular dies into a vulcanization device, and transfers the vulcanized finished rubber belts and the circular die to the disassembling and assembling station.

10 Claims, 7 Drawing Sheets

(51) Int. Cl.
    *B29K 21/00*     (2006.01)
    *B29K 105/24*     (2006.01)
    *B29L 29/00*     (2006.01)

(56) References Cited

OTHER PUBLICATIONS

Machine English translation of CN210453399U, Accessed Jun. 12, 2024 (Year: 2020).*

* cited by examiner

A

US 12,083,757 B2

PRODUCTION LINE WITH AUTOMATIC BELT DISASSEMBLING AND ASSEMBLING FOR RUBBER BELT VULCANIZATION

CROSS REFERENCE TO RELATED APPLICATION

This application is a national stage application of International Patent Application No. PCT/CN2022/096135, filed on May 31, 2022, which claims priority of the Chinese Patent Application No. 202210410549.2, filed on Apr. 19, 2022, both of which are incorporated by reference in their entities.

TECHNICAL FIELD

The present disclosure relates to production equipment for vulcanizing belt, in particular to a production line with automatic belt disassembling and assembling for rubber belt vulcanization.

BACKGROUND ART

As a standard part in the industry, belts are in extremely high demand in the market. In a production process of belt, a vulcanization and heating process is required after a wrapping process. Before the vulcanization and heating process, a plurality of wrapped belts need to be sleeved on a circular-ring-shaped vulcanization die one by one. The circular dies sleeved with the belts are stacked from top to bottom and are conveyed into a vulcanization container for the vulcanization and heating process. However, most of the above operations are manual operations, and there is a problem that the automation degree is low. In addition, the low efficiency of manual operation will significantly reduce the production efficiency of the belt production line whose front and rear procedures have been automated.

SUMMARY

In view of this, the present disclosure aims to provide a production line with automatic belt disassembling and assembling for rubber belt vulcanization, which has the advantages of high automation degree and high production efficiency.

In order to solve the above technical problem, the technical solution of the present disclosure is as follows: a production line with automatic belt disassembling and assembling for rubber belt vulcanization includes a working platform; a front side of the working platform is provided with a disassembling and assembling station; a rear side of the working platform is provided with a circular die placement station.

Two sides of the working platform are respectively provided with a raw rubber belt placement platform and a finished rubber belt placement platform; a front side of the raw rubber belt placement platform is provided with a raw rubber belt loading station; a rear side of the raw rubber belt placement platform is provided with a raw rubber belt unloading station; a front side of the finished rubber belt placement platform is provided with a finished rubber belt unloading station; a rear side of the finished rubber belt placement platform is provided with a finished rubber belt loading station; the raw rubber belt unloading station, the disassembling and assembling station and the finished rubber belt loading station are located in a same straight line.

The production line further includes a truss; the truss spans over the raw rubber belt placement platform, the working platform and the finished rubber belt placement platform; a rubber belt clamping device, a circular die clamping device and a transferring device are arranged on the truss in sequence; a raw rubber belt can be transferred by the rubber belt clamping device from the raw rubber belt unloading station to the disassembling and assembling station, and a finished rubber belt can be transferred by the rubber belt clamping device from the disassembling and assembling station to the finished rubber belt loading station; a circular die can be controlled by the circular die clamping device to move between the circular die placement station and the disassembling and assembling station; the transferring device may transfer the stacked raw rubber belts and the circular die into a vulcanization device; and the transferring device may transfer the vulcanized finished rubber belts and the circular die to the disassembling and assembling station.

By means of the above technical solution, before the production line with automatic belt disassembling and assembling is used, raw rubber belts are tidily stacked at the raw rubber belt loading station; and after the stacking of the raw rubber belts is completed, the stacked raw rubber belts stacked at the raw rubber belt loading station are pushed to the raw rubber belt unloading station by means of a transferring mechanism. The circular dies are tidily stacked at the circular die placement station. A die frame is placed at the disassembling and assembling station.

During use, in a first step, a raw rubber belt at a top of the raw rubber belt unloading station is clamped by the rubber belt clamping device, and the raw rubber belt is sleeved on the die frame; in a second step, the circular die at a top of the circular die placement station is clamped by the circular die clamping device, and the circular die is sleeved on the die frame; in a third step, the first step and the second step are repeated to stack the raw rubber belt on the circular die from top to bottom; in a fourth step, a die cover rotatably connected with a bolt at a top is clamped by the transferring device, and the die cover is covered at an upper end of the die frame; in a fifth step, the bolt is controlled by the transferring device to rotate, so as to press and fix the die cover on the die frame; and in a sixth step, the stacked raw rubber belts and the circular die are transferred by the transferring device into the vulcanization device.

When the raw rubber belts are vulcanized into finished rubber belts, in a first step, the stacked finished rubber belts and the circular die are transferred by the transferring device to the disassembling and assembling station; in a second step, the bolt is controlled by the transferring device to rotate, so as to remove the die cover from the die frame; in a third step, the circular die at the top of the disassembling and assembling station is clamped by the circular die clamping device, and the circular die is transferred by the circular die clamping device from the disassembling and assembling station to the circular die placement station; and in a fourth step, the second step and the third step are repeated; the finished rubber belts are tidily stacked at the finished rubber belt loading station; and the circular dies are tidily stacked at the circular die placement station.

The production line with automatic belt disassembling and assembling is configured for completing stacking and separation of the rubber belts and the circular dies, which has the advantages of high automation degree and high production efficiency.

In some embodiments, a raw rubber belt conveying belt may be arranged on the raw rubber belt placement platform; a surface of the raw rubber belt conveying belt may be provided with a plurality of raw rubber belt fixing frames; and the plurality of raw rubber belt fixing frames may be uniformly distributed along a conveying direction of the raw rubber belt conveying belt.

By means of the above-mentioned technical solution, the raw rubber belts at the raw rubber belt loading station can be conveyed to the raw rubber belt unloading station through the raw rubber belt conveying belt, thus further improving the automation degree and the production efficiency of the production line with automatic belt disassembling and assembling.

In some embodiments, a side wall of each raw rubber belt fixing frame may be slidably connected with a supporting plate; a lifting driving mechanism may be arranged on each of the raw rubber belt fixing frames; and the lifting driving mechanism may be configured to drive the supporting plate to slide up and down.

By means of the above-mentioned technical solution, when the rubber belt clamping device is configured to take away the raw rubber belt at the top of the raw rubber belt fixing frame, the supporting plate can be driven by the lifting driving mechanism to move up to jack the raw rubber belt. As such, the rubber belt clamping device can conveniently clamp the raw rubber belt at the top of the rubber belt fixing frame.

In some embodiments, a finished rubber belt conveying belt may be arranged on the finished rubber belt placement platform; a surface of the finished rubber belt conveying belt may be provided with a plurality of finished rubber belt fixing frames; and the plurality of finished rubber belt fixing frames may be uniformly distributed along a conveying direction of the finished rubber belt conveying belt.

By means of the above-mentioned technical solution, the finished rubber belts at the finished rubber belt loading station can be conveyed to the finished rubber belt unloading station through the finished rubber belt conveying belt, thus further improving the automation degree and the production efficiency of the production line with automatic belt disassembling and assembling.

In some embodiments, the rubber belt clamping device may include a mechanical arm for rubber belt; a clamping plate for rubber belt arranged on the mechanical arm for rubber belt; and pneumatic clamping jaws uniformly distributed along a circumferential direction of the clamping plate for rubber belt.

By means of the above-mentioned technical solution, during use, the clamping plate for rubber belt and the pneumatic clamping jaws can be controlled to move by the mechanical arm for rubber belt, so that the pneumatic clamping jaws align to the raw rubber belts or the finished rubber belts, and then the raw rubber belts or the finished rubber belts can be clamped by the pneumatic clamping jaws.

In some embodiments, a driving motor is arranged between the mechanical arm for rubber belt and the clamping plate for rubber belt; the driving motor is configured to drive the clamping plate for rubber belt to circumferentially rotate; a side wall of each pneumatic clamping jaw is provided with a driving cylinder; a piston rod of the driving cylinder vertically downwards extends; an end part of the piston rod of the driving cylinder is connected with a movable frame; a bottom of the movable frame is rotatably connected with a pressing roller; and the pressing roller is disposed along a radial direction of the clamping plate for rubber belt.

By means of the above-mentioned technical solution, after the raw rubber belts are sleeved on the die frame, the movable frame is controlled by the driving cylinder to move down, so that the pressing roller resists against the raw rubber belt; and the clamping plate for rubber belt is then controlled by the driving motor to rotate circumferentially, so as to flatten the raw rubber belt.

In some embodiments, the circular die clamping device includes a mechanical arm for a circular die, a clamping plate for circular die arranged on the mechanical arm for circular die, a plurality of clamping blocks uniformly distributed along a circumferential direction of the clamping plate for circular die, and a sliding driving mechanism configured to drive the clamping blocks to slide along a radial direction of the clamping plate for circular die.

By means of the above-mentioned technical solution, during use, the clamping plate for circular die can be driven to move by the mechanical arm for circular die, so that the clamping blocks align to the circular die; and the plurality of clamping blocks can be then controlled by the sliding driving mechanism to be close to each other, so as to clamp the circular die.

In some embodiments, the transferring device includes a transferring mechanical arm, a transferring mounting plate arranged on the transferring mechanical arm, an actuation motor arranged at a bottom of the transferring mounting plate, and pneumatic clamping fingers arranged on an output shaft of the actuation motor.

By means of the above-mentioned technical solution, during use, the transferring mounting plate can be driven by the transferring mechanical arm to move, so that the pneumatic clamping fingers align to the bolt; and the pneumatic clamping fingers are then configured to clamp the head of the bolt; and the pneumatic clamping fingers are driven by the actuation motor to rotate, so as to achieve threaded connection between the bolt and the die frame.

In some embodiments, a connecting column is arranged between the actuation motor and the pneumatic clamping fingers; the connecting column includes a driving section fixedly connected to the actuation motor and a driven section fixedly connected to the pneumatic clamping fingers; a rotating shaft is integrally formed with the driving section at a lower end of the driving section; a plurality of ribs are circumferentially arranged at a side wall of the rotating shaft; each rib has an arc-shaped side wall; a rotating slot for inserting the rotating shaft is formed in an upper end of the driven section; grooves for inserting the ribs are formed in an inner wall of the rotating slot;

the production line further includes a plurality of pneumatic clamping devices uniformly distributed along a circumferential direction of the connecting column; each of the pneumatic clamping devices includes a pneumatic telescopic rod arranged on an outer wall of the driven section, a locking block arranged on the pneumatic telescopic rod, an air source arranged inside the driving section, and a control switch connected to the pneumatic telescopic rod and the air source; an arc-shaped slot is formed in a bottom of the rotating slot; the arc-shaped slot is disposed along the circumferential direction of the rotating slot; a connecting hole is formed in a bottom of the arc-shaped slot; the connecting hole is in communication with an inner cavity of the pneumatic telescopic rod; the control switch includes a sliding block integrally formed with the rotating shaft at the bottom of the rotating shaft; the sliding block is slidably connected into the arc-shaped slot; a bottom of the sliding block is provided with an air inlet hole and an air outlet hole; the air inlet hole is in communication with an air outlet of the air source; and the air outlet hole penetrates through an outer wall of the driving section.

By means of the above-mentioned technical solution, when it is necessary to achieve threaded connection between the bolt and the die frame, under the action of the ribs and the grooves, the actuation motor can drive the pneumatic clamping fingers to circumferentially rotate through the connecting column. In this process, the sliding block resists against a front end of the arc-shaped slot; the air inlet hole is in communication with the connecting hole; and the pneumatic telescopic rods gradually extend, so that it is not easy for the locking blocks to touch the die frame. When the bolt presses and fixes the die cover at the top of the die frame, the bolt cannot continue to rotate during which the actuation motor drives the driving section to circumferentially rotate, and the ribs and the inner walls of the grooves will elastically deform; and at this time, the sliding block will slide in the arc-shaped slot. When the sliding block rotates to be in communication with the air outlet hole and the connecting hole, the pneumatic telescopic rods retract, and the locking blocks clamp the die cover. When the sliding block rotates to resist against a rear end of the arc-shaped slot, the actuation motor is turned off.

In some embodiments, a chutes are formed in the side wall of the rotating shaft such that the chutes align to the ribs respectively; actuation cylinders are arranged in the chute; and piston rods of the actuation cylinders are connected to a corresponding one of the ribs.

By means of the above-mentioned technical solution, when the finished rubber belts and the circular die are placed on a disassembling and assembling platform, in a first step, the ribs are controlled by the actuation cylinders to retract into the chutes; in a second step, the driving section is controlled by the actuation motor to anticlockwise rotate, so that the sliding block slides towards the front end of the arc-shaped slot; in a third step, when the sliding block resists against the front end of the arc-shaped slot, the pneumatic telescopic rods extend, and the locking blocks are separated from the die cover; and in a fourth step, the actuation motor controls the pneumatic clamping fingers to anticlockwise rotate through the connecting column, so as to screw out the bolt.

Figure 1:
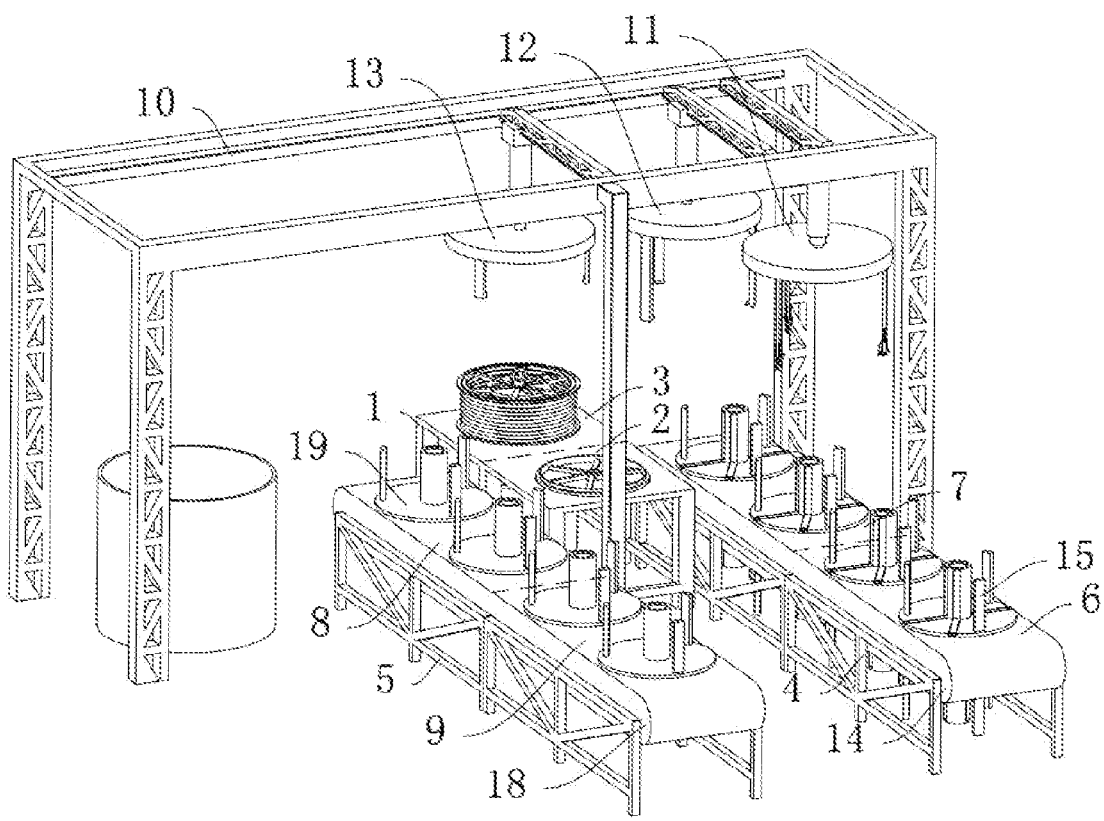
FIG. 1 is a schematic structural diagram of an embodiment.

Reference signs in the drawings: 1: working platform; 2: disassembling and assembling station; 3: circular die placement station; 4: raw rubber belt placement platform; 5: finished rubber belt placement platform; 6: raw rubber belt loading station; 7: raw rubber belt unloading station; 8: finished rubber belt unloading station; 9: finished rubber belt loading station; 10: truss; 11: rubber belt clamping device; 111: mechanical arm for rubber belt; 112: clamping plate for rubber belt; 113: pneumatic clamping jaw; 12: circular die clamping device; 121: mechanical arm for circular die; 122: clamping plate for circular die; 123: clamping block; 124: sliding driving mechanism; 13: transferring device; 131: transferring mechanical arm; 132: transferring mounting plate; 133: actuation motor; 134: pneumatic clamping finger; 14: raw rubber belt conveying belt; 15: raw rubber belt fixing frame; 16: supporting plate; 17: lifting driving mechanism; 18: finished rubber belt conveying belt; 19: finished rubber belt fixing frame; 20: driving motor; 21: driving cylinder; 22: movable frame; 23: pressing roller; 35: connecting column; 351: driving section; 352: driven section; 24: rotating shaft; 25: rib; 26: rotating slot; 27: groove; 28: pneumatic clamping device; 281: pneumatic telescopic rod; 282: locking block; 283: air source; 284: control switch; 29: arc-shaped slot; 30: connecting hole; 31: air inlet hole; 32: air outlet hole; 33: chute; and 34: actuation cylinder.

DETAILED DESCRIPTION OF THE EMBODIMENTS

The specific implementations of the present invention are further described in detail below in combination with accompanying drawings, so that the technical solutions of the present invention are easier to understand and master.

Figure 2:
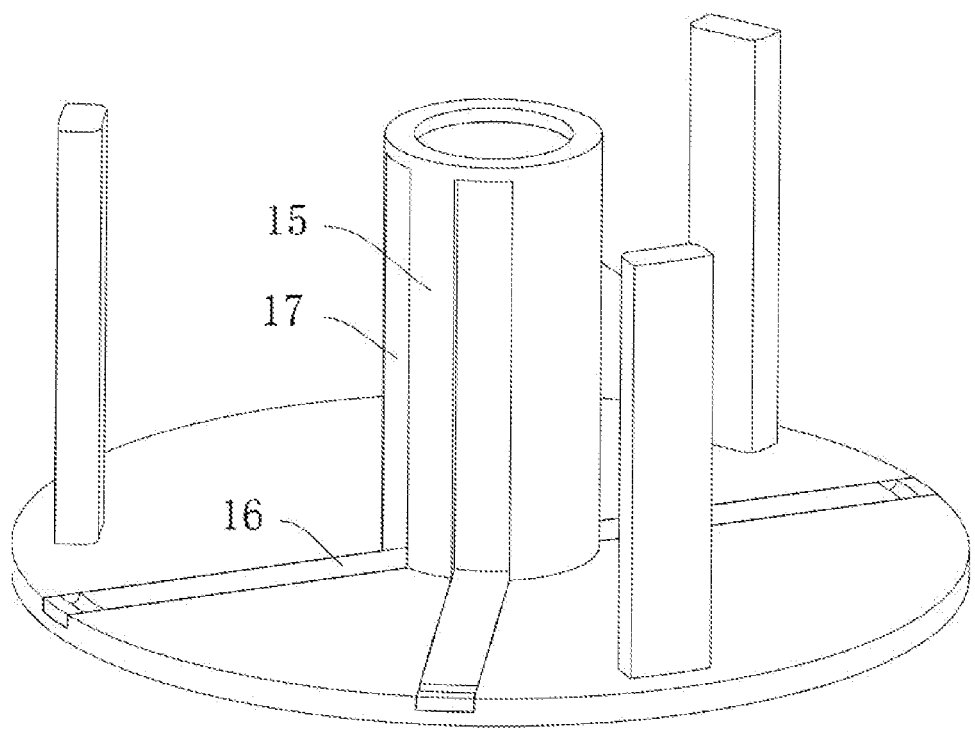
FIG. 2 is a schematic structural diagram of a raw rubber belt fixing frame.
Figure 3:
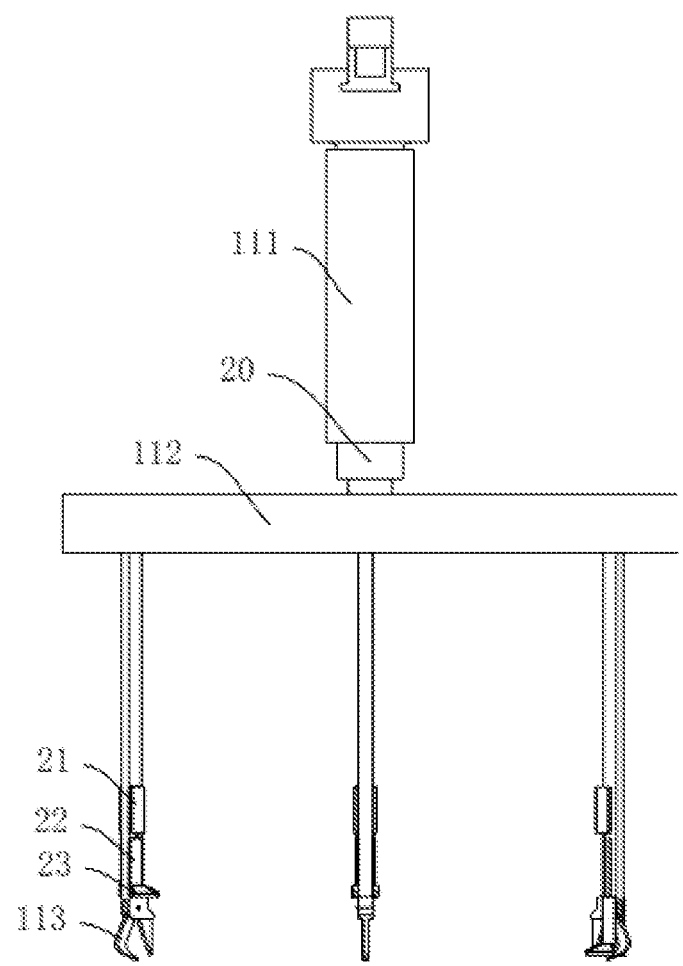
FIG. 3 is a schematic structural diagram of a rubber belt clamping device.
Figure 4:
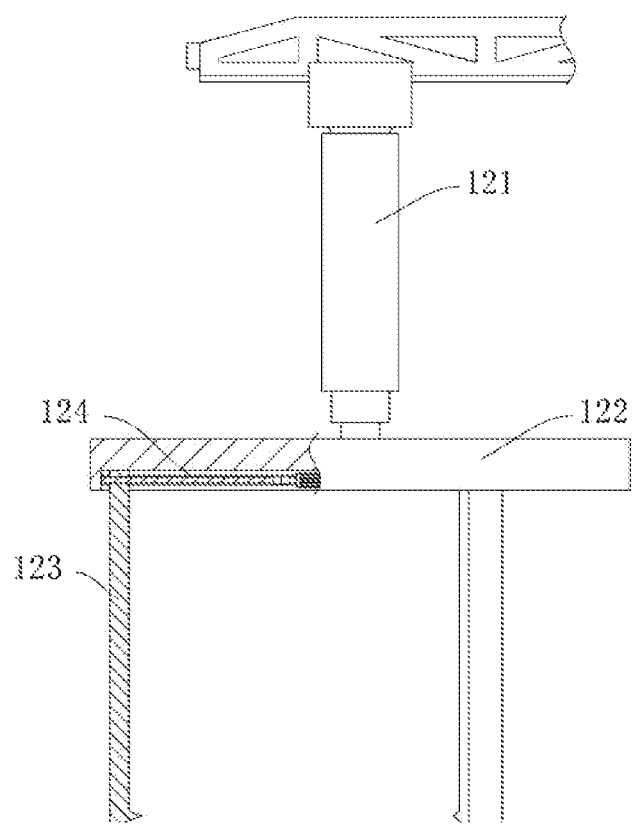
FIG. 4 is a schematic structural diagram of a circular die clamping device.
Figure 5:
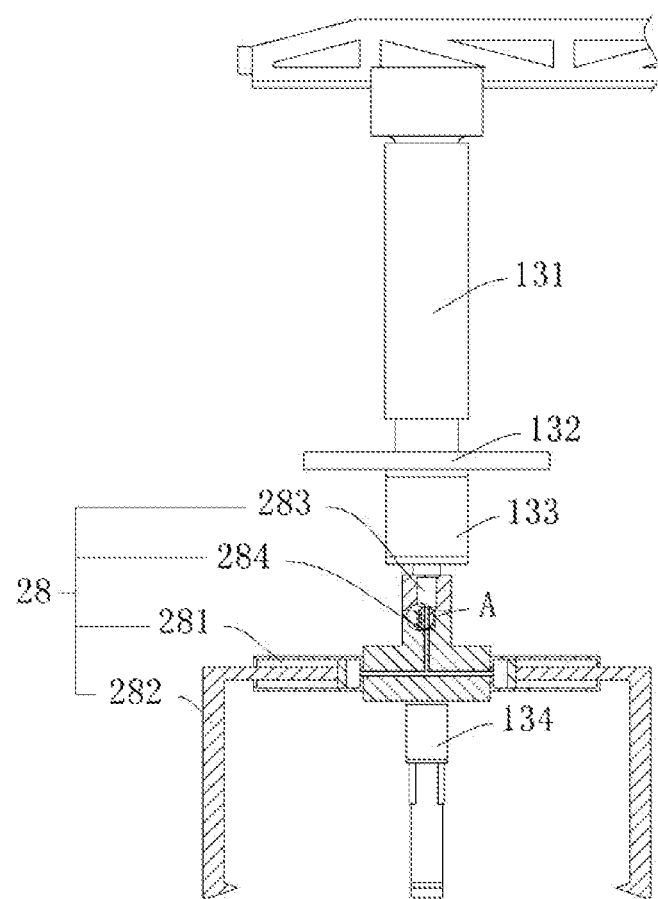
FIG. 5 is a schematic structural diagram of a transferring device.
Figure 6:
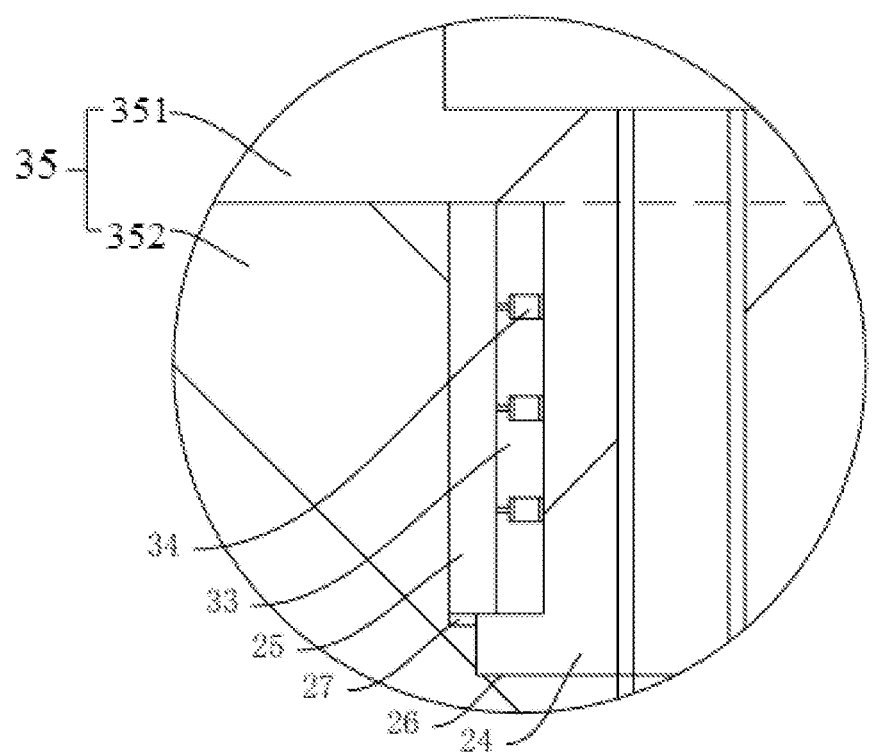
FIG. 6 is an enlarged diagram of the part A of FIG. 5.
Figure 7:
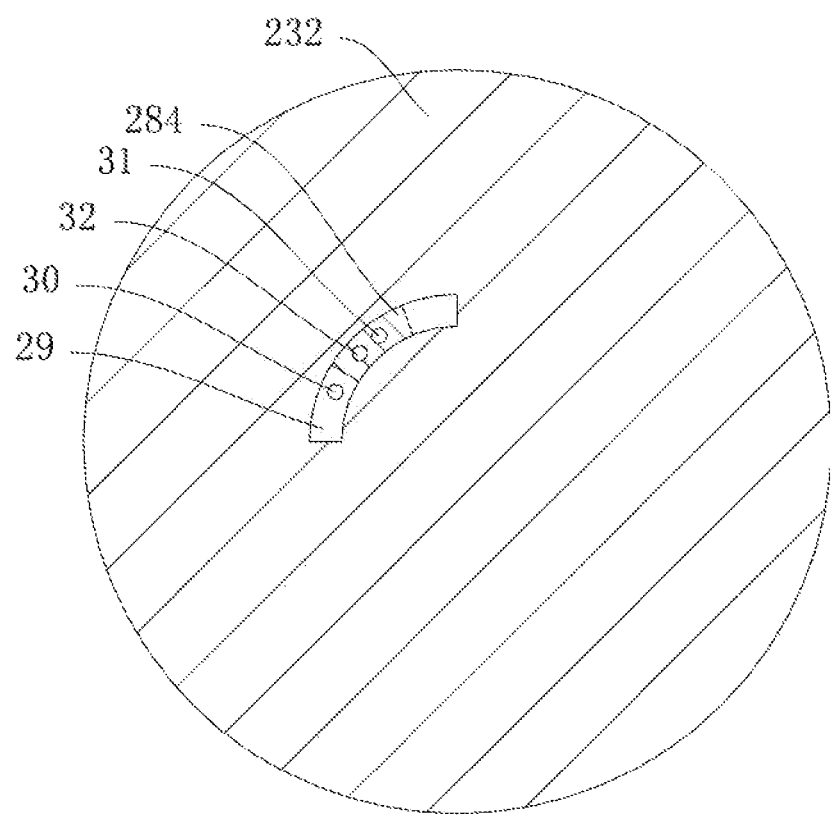
FIG. 7 is a schematic sectional diagram of a connecting column.

A production line with automatic belt disassembling and assembling for rubber belt vulcanization, as shown in FIGS. 1 to 7, includes a working platform 1; a front side of the working platform 1 is provided with a disassembling and assembling station 2; and a rear side of the working platform 1 is provided with a circular die placement station 3.

Two sides of the working platform 1 are respectively provided with a raw rubber belt placement platform 4 and a finished rubber belt placement platform 5.

A front side of the raw rubber belt placement platform 4 is provided with a raw rubber belt loading station 6, and a rear side of the raw rubber belt placement platform 4 is provided with a raw rubber belt unloading station 7. A raw rubber belt conveying belt 14 is arranged on the raw rubber belt placement platform 4; a surface of the raw rubber belt conveying belt 14 is provided with a plurality of raw rubber belt fixing frames 15; and the plurality of raw rubber belt fixing frames 15 are uniformly distributed along a conveying direction of the raw rubber belt conveying belt 14. A side wall of each raw rubber belt fixing frame 15 is slidably connected with a supporting plate 16, and the supporting plate 16 can slide up and down on a surface of the raw rubber belt fixing frame 15. A lifting driving mechanism 17 is arranged on each raw rubber belt fixing frame 15; and an output end of the lifting driving mechanism 17 is connected with the supporting plate 16, so as to drive the supporting plate 16 to slide. In this embodiment, the lifting driving mechanism 17 can adopt a motor to cooperate with a screw nut.

A front side of the finished rubber belt placement platform 5 is provided with a finished rubber belt unloading station 8; and a rear side of the finished rubber belt placement platform 5 is provided with a finished rubber belt loading station 9. A finished rubber belt conveying belt 18 is arranged on the finished rubber belt placement platform 5; a surface of the finished rubber belt conveying belt 18 is provided with a plurality of finished rubber belt fixing frames 19; and the plurality of finished rubber belt fixing frames 19 are uniformly distributed along a conveying direction of the finished rubber belt conveying belt 18.

The raw rubber belt unloading station 7, the disassembling and assembling station 2 and the finished rubber belt loading station 9 are in the same straight line.

The production line further includes a truss 10 located above the raw rubber belt placement platform 4, the working platform 1 and the finished rubber belt placement platform 5. A rubber belt clamping device 11, a circular die clamping device 12 and a transferring device 13 are arranged on the truss 10 in sequence. A raw rubber belt can be transferred by the rubber belt clamping device 11 from the raw rubber belt unloading station 7 to the disassembling and assembling station 2. A finished rubber belt can be transferred by the rubber belt clamping device 11 from the disassembling and assembling station 2 to the finished rubber belt loading station 9. The circular die clamping device 12 can control a circular die to move between the circular die placement station 3 and the disassembling and assembling station 2. The transferring device 13 can transfer the stacked raw rubber belts and the circular die into a vulcanization device. The transferring device 13 can transfer the vulcanized finished rubber belts and the circular die to the disassembling and assembling station 2.

The rubber belt clamping device 11 includes a mechanical arm for rubber belt 111; a clamping plate for rubber belt 112, which is arranged on the mechanical arm for a rubber belt 111; and pneumatic clamping jaws 113 uniformly distributed along a circumferential direction of the clamping plate for a rubber belt 112. The mechanical arm for rubber belt 111 can drive the pneumatic clamping jaws 113 to move through the clamping plate for rubber belt 112.

A driving motor 20 is arranged between the mechanical arm for rubber belt 111 and the clamping plate for rubber belt 112. The driving motor 20 is configured to drive the clamping plate for rubber belt 112 to circumferentially rotate. A side wall of each pneumatic clamping jaw 113 is provided with a driving cylinder 21, and a piston rod of the driving cylinder 21 vertically downwards extends. An end part of the piston rod of the driving cylinder 21 is connected with a movable frame 22; a bottom of the movable frame 22 is rotatably connected with a pressing roller 23; and the pressing roller 23 is disposed along a radial direction of the clamping plate for rubber belt 112.

The circular die clamping device 12 includes a mechanical arm for circular die 121; a clamping plate for circular die 122, which is arranged on the mechanical arm for circular die 121; a plurality of clamping blocks 123 uniformly distributed along a circumferential direction of the clamping plate for circular die 122; and a sliding driving mechanism 124 which is configured to drive the clamping blocks 123 to slide along a radial direction of the clamping plate for circular die 122. During use, the mechanical arm for circular die 121 can drive the plurality of clamping blocks 123 to move through the clamping plate for circular die 122. When the circular die is located between the plurality of clamping blocks 123, the sliding driving mechanism 124 can drive the plurality of clamping blocks 123 to be close to each other, so as to clamp the circular die. In this embodiment, the sliding driving mechanism 124 can adopt a motor to cooperate with a screw nut.

The transferring device 13 includes a transferring mechanical arm 131, a transferring mounting plate 132 arranged on the transferring mechanical arm 131, an actuation motor 133 arranged at a bottom of the transferring mounting plate 132, and pneumatic clamping fingers 134 arranged on an output shaft of the actuation motor 133. The transferring mechanical arm 131 can drive the pneumatic clamping fingers 134 to move through the transferring mounting plate 132. The actuation motor 133 can drive the pneumatic clamping fingers 134 to circumferentially rotate.

A connecting column 35 is arranged between the actuation motor 133 and the pneumatic clamping finger 134. The connecting column 35 includes a driving section 351 fixedly connected to the actuation motor 133 and a driven section 352 fixedly connected to the pneumatic clamping fingers 134; a rotating shaft 24 is integrally formed with the driving section at a lower end of the driving section 351; a plurality of ribs 25 are arranged at a side wall of the rotating shaft 24 along the circumferential direction; and each rib 25 has an arc-shaped side wall. Chutes 33 are formed in positions of the side wall of the rotating shaft 24 that are opposite to the ribs 25 respectively; actuation cylinders 34 are arranged in each chute 33; and piston rods of the actuation cylinders 34 are connected to a corresponding rib 25. A rotating slot 26 for inserting the rotating shaft 24 is formed in an upper end of the driven section 352; and grooves 27 respectively for inserting the ribs 25 are formed in an inner wall of the rotating slot 26. The ribs 25 are snapped into the grooves 27, which can restrain relative rotation between the driving section 351 and the driven section 352. When the ribs 25 and the inner walls of the grooves 27 elastically deform, the driving section 351 and the driven section 352 may relatively rotate.

The production line further includes a plurality of pneumatic clamping devices 28 uniformly distributed along the circumferential direction of the connecting column 35. Each of the pneumatic clamping devices 28 includes a pneumatic telescopic rod 281 arranged on an outer wall of the driven section 352, a locking block 282 arranged on the pneumatic telescopic rod 281, an air source 283 arranged inside the driving section 351, and a control switch 284 connected to the pneumatic telescopic rod 281 and the air source 283. The pneumatic telescopic rod 281 includes a sleeve fixedly connected to a side wall of the driving section 351, an inner core slidably connected into the sleeve, a piston arranged on the inner core, and a spring arranged between the sleeve and the piston. When the air source 283 is used to fill the sleeve, air entering the sleeve can drive the inner core to move towards the outside of the sleeve through the piston. When the air inside the sleeve flows outwards, the spring can pull the inner core into the sleeve through the piston.

An arc-shaped slot 29 is formed in a bottom of the rotating slot 26; and the arc-shaped slot 29 is disposed along the circumferential direction of the rotating slot 26. A connecting hole 30 is formed in a bottom of the arc-shaped slot 29, and the connecting hole 30 is in communication with an inner cavity of the pneumatic telescopic rod 281. The control switch 284 includes a sliding block integrally formed with the rotating shaft at a bottom of the rotating shaft 24. The sliding block is slidably connected into the arc-shaped slot 29. A bottom of the sliding block is provided with an air inlet hole 31 and an air outlet hole 32; the air inlet hole 31 is in communication with an air outlet of the air source 283; and the air outlet hole 32 penetrates through an outer wall of the driving section 351. When the sliding block resists against a front end of the arc-shaped slot 29, the air inlet hole 31 is in communication with the connecting hole 30, and the air source 283 may fill the sleeve with air. When the sliding block slides towards a rear end of the arc-shaped slot 29, the air outlet hole 32 may be in communication with the connecting hole 30. At this time, the air inside the sleeve can be discharged to the outside.

The above descriptions are only typical examples of the present disclosure. In addition, the present disclosure can also have other various specific implementations, and all technical solutions formed by equivalent replacement or equivalent transformation shall fall within the scope of protection of the present disclosure.

What is claimed is:

1. A production line with automatic belt disassembling and assembling for rubber belt vulcanization, comprising a working platform, wherein a front side of the working platform is provided with a disassembling and assembling station; and a rear side of the working platform is provided with a circular die placement station;

two sides of the working platform are respectively provided with a raw rubber belt placement platform and a finished rubber belt placement platform; a front side of the raw rubber belt placement platform is provided with a raw rubber belt loading station; a rear side of the raw rubber belt placement platform is provided with a raw rubber belt unloading station; a front side of the finished rubber belt placement platform is provided with a finished rubber belt unloading station; a rear side of the finished rubber belt placement platform is provided with a finished rubber belt loading station; the raw rubber belt unloading station, the disassembling and assembling station and the finished rubber belt loading station are located in a same straight line;

the production line further comprising a truss; wherein, the truss spans over the raw rubber belt placement platform, the working platform and the finished rubber belt placement platform; a rubber belt clamping device, a circular die clamping device and a transferring device are provided on the truss in sequence; a raw rubber belt is capable of being transferred by the rubber belt clamping device from the raw rubber belt unloading station to the disassembling and assembling station, and a finished rubber belt is capable of being transferred by the rubber belt clamping device from the disassembling and assembling station to the finished rubber belt loading station; a circular die is capable of being controlled by the circular die clamping device to move between the circular die placement station and the disassembling and assembling station; the transferring device is capable of transferring stacked raw rubber belts and the circular die into a vulcanization device; and the transferring device is capable of transferring vulcanized finished rubber belts and the circular die to the disassembling and assembling station.

2. The production line with automatic belt disassembling and assembling for rubber belt vulcanization according to claim 1, wherein a raw rubber belt conveying belt is provided on the raw rubber belt placement platform; a surface of the raw rubber belt conveying belt is provided with a plurality of raw rubber belt fixing frames; and the plurality of raw rubber belt fixing frames are uniformly distributed along a conveying direction of the raw rubber belt conveying belt.

3. The production line with automatic belt disassembling and assembling for rubber belt vulcanization according to claim 2, wherein a side wall of each of the plurality of raw rubber belt fixing frames is slidably connected with a supporting plate; a lifting driving mechanism is arranged on each of the plurality of raw rubber belt fixing frames; and the lifting driving mechanism is configured to drive the supporting plate to slide up and down.

4. The production line with automatic belt disassembling and assembling for rubber belt vulcanization according to claim 1, wherein a finished rubber belt conveying belt is provided on the finished rubber belt placement platform; a surface of the finished rubber belt conveying belt is provided with a plurality of finished rubber belt fixing frames; and the plurality of finished rubber belt fixing frames are uniformly distributed along a conveying direction of the finished rubber belt conveying belt.

5. The production line with automatic belt disassembling and assembling for rubber belt vulcanization according to claim 1, wherein the rubber belt clamping device comprises a mechanical arm for rubber belt; a clamping plate for rubber belt arranged on the mechanical arm for rubber belt; and pneumatic clamping jaws uniformly distributed along a circumferential direction of the clamping plate for rubber belt.

6. The production line with automatic belt disassembling and assembling for rubber belt vulcanization according to claim 5, wherein a driving motor is provided between the mechanical arm for rubber belt and the clamping plate for rubber belt; the driving motor is configured to drive the clamping plate for rubber belt to circumferentially rotate; a side wall of each of the pneumatic clamping jaws is provided with a driving cylinder; a piston rod of the driving cylinder vertically downwards extends; an end part of the piston rod of the driving cylinder is connected with a movable frame; a bottom of the movable frame is rotatably connected with a pressing roller; and the pressing roller is disposed along a radial direction of the clamping plate for rubber belt.

7. The production line with automatic belt disassembling and assembling for rubber belt vulcanization according to claim 1, wherein the circular die clamping device comprises a mechanical arm for circular die, a clamping plate for circular die arranged on the mechanical arm for circular die, a plurality of clamping blocks uniformly distributed along a circumferential direction of the clamping plate for circular die, and a sliding driving mechanism configured to drive the clamping blocks to slide along a radial direction of the clamping plate for circular die.

8. The production line with automatic belt disassembling and assembling for rubber belt vulcanization according to claim 1, wherein the transferring device comprises a transferring mechanical arm, a transferring mounting plate arranged on the transferring mechanical arm, an actuation motor arranged at a bottom of the transferring mounting plate, and pneumatic clamping fingers arranged on an output shaft of the actuation motor.

9. The production line with automatic belt disassembling and assembling for rubber belt vulcanization according to claim 8, wherein a connecting column is provided between the actuation motor and the pneumatic clamping fingers; the connecting column comprises a driving section fixedly connected to the actuation motor and a driven section fixedly connected to the pneumatic clamping fingers; a rotating shaft is integrally formed with the driving section at a lower end of the driving section; a plurality of ribs are provided circumferentially at a side wall of the rotating shaft; side walls of the ribs are arc-shaped; a rotating slot for inserting the rotating shaft is formed in an upper end of the driven section; grooves for inserting the ribs are formed in an inner wall of the rotating slot;

the production line further comprises a plurality of pneumatic clamping devices uniformly distributed along a circumferential direction of the connecting column; each of the pneumatic clamping devices comprises a pneumatic telescopic rod arranged on an outer wall of the driven section, a locking block arranged on the pneumatic telescopic rod, an air source arranged inside the driving section, and a control switch connected to the pneumatic telescopic rod and the air source; an arc-shaped slot is formed in a bottom of the rotating slot; the arc-shaped slot is disposed along a circumferential direction of the rotating slot; a connecting hole is formed in a bottom of the arc-shaped slot; the connecting hole is in communication with an inner cavity of the pneumatic telescopic rod; the control switch comprises a sliding block integrally formed with the rotating shaft at a bottom of the rotating shaft; the sliding block is slidably connected into the arc-shaped slot; a bottom of the sliding block is provided with an air inlet hole and an air outlet hole; the air inlet hole is in communication with an air outlet of the air source; and the air outlet hole penetrates through an outer wall of the driving section.

10. The production line with automatic belt disassembling and assembling for rubber belt vulcanization according to claim 9, wherein chutes are formed in the side wall of the rotating shaft such that the chutes align to the ribs respectively; actuation cylinders are provided in each of the chutes; and piston rods of the actuation cylinders are connected to a corresponding one of the ribs.

\* \* \* \* \*